Patented May 16, 1933                                          1,909,092

UNITED STATES PATENT OFFICE

HERMAN A. BRUSON, OF PHILADELPHIA, PENNSYLVANIA, ASSIGNOR, BY MESNE ASSIGNMENTS, TO AMERICAN CYANAMID COMPANY, OF NEW YORK, N. Y.

ORGANIC SOLVENTS AND PLASTICIZER

No Drawing.   Application filed May 29, 1931. Serial No. 541,104.

This application relates to lacquers, containing aliphatic or aromatic esters of monobasic keto-benzoic acids having the general formula $$R-CO-R'-COOH$$

wherein R and R' represent aromatic nuclei, and is a division of Serial No. 397,143 filed Oct. 3, 1929. Typical acids which belong to this class are:

Ortho-benzoyl-benzoic acid

Para-toluyl-o-benzoic acid

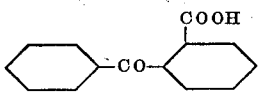

Naphthoyl-o-benzoic acid

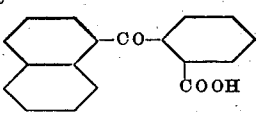

and their derivatives such as 2, 4-dichloro-benzoyl-o-benzoic acid, methyl-isopropyl-benzoyl-o-benzoic acid (cymoyl-o-benzoic acid), and the like.

The lower esters of some of these acids, such as the methyl- and ethyl-esters, have in part already been described in the literature as crystalline solids. They have not however found any extensive commercial application in the arts. Moreover, it could not have been foretold that the higher esters of these acids would form valuable, high boiling oily liquids which solubilize nitrocellulose and which can be used in conjunction with other solvents in the preparation of pyroxylin lacquers, as plasticizers for the final nitro-cellulose film.

We have discovered that the higher esters of the aforementioned keto-benzoic acids possess physical properties which are desirable in plasticizers for nitrocellulose or acetyl cellulose films. They are all high boiling, heavy liquids having a marked solubilizing action upon nitrocellulose and possessing sufficient tackiness to give the film in which they are present a certain degree of adhesion.

The esters which we have prepared are all derived from monohydric alcohols which contain three or more carbon atoms in the molecule, such as iso-propyl, butyl, iso-amyl, beta-ethoxyethyl, beta-butoxyethyl, benzyl and cyclohexyl alcohols. These esters may all be prepared by heating the corresponding monohydric alcohol with any one of the keto-benzoic acids having the general formula, $$R-CO-R'-COOH$$

wherein R and R' are aromatic nuclei, in the presence of a dehydration catalyst such as sulphuric acid, hydrochloric acid, zinc chloride, or the like; subsequently removing the catalyst, distilling off the excess of alcohol, and fractionating the residual oil in vacuo.

Illustrations are given below of the general method of preparation of the above esters, as well as a table of the physical properties of other typical esters of the same class, which we have prepared as new compounds.

*Example 1.—butyl-o-benzoyl-benzoate*

A mixture of 75 grams ortho-benzoyl-benzoic acid, 150 cubic centimeters butyl alcohol, and a dehydration catalyst, preferably 10 cc. of concentrated sulphuric acid (Sp. Gr. 1.84) are refluxed at the boiling point for 8 hours. The mixture is allowed to cool and is then washed, first with water to remove the sulphuric acid, then with dilute sodium carbonate solution, and finally with water to remove traces of alkali. The oil is then fractionated. At first unchanged butyl alcohol distills over. The butyl ester then comes over as a colorless, limpid, oily liquid, boiling at 241–244° C. under 20 m. m. pressure.

*Example 2.—cyclohexyl ester of para-toluyl-o-benzoic acid*

Boil under reflux, a mixture of 75 gr. para-toluyl-o-benzoic acid, 150 cc. cyclohexanol, and 10 cc. concentrated sulphuric acid for 6 hrs. After cooling, the product is washed with water and sodium carbonate solution until all traces of free acid are removed. The excess cyclohexanol is then distilled off at reduced pressure. The residual high boiling oil is fractionated in vacuo, whereupon the cyclohexyl ester distills over at 252–254° C. under 7 m. m. pressure. It forms a thick, colorless viscous oil.

*Example 3.—beta-ethoxy-ethyl ester of ortho-benzoyl benzoic acid*

To 120 cubic centimeters of ethylene glycol-mono-ethyl ether,

50 gr. of ortho-benzoyl benzoic acid and 10 cc. concentrated sulphuric acid are added, and the mixture is boiled for 3 hours under reflux. The cooled liquid is washed with water and dilute sodium carbonate solution to remove excess alcohol and acid, and the residual ester fractionated in vacuo. It comes over as a colorless oil at 221–225° C. under 5 m. m. pressure.

*Example 4.—butyl-ortho-naphthoyl benzoate*

50 grams of ortho-naphthoyl benzoic acid are boiled under reflux with 100 cc. of butyl alcohol and 10 cc. concentrated sulphuric acid for 5 hours. The cooled liquid is washed free from unchanged acid and catalyst with water and sodium carbonate solution, and the residual oil is fractionally distilled in vacuo. At first unchanged butyl alcohol come over. The ester then distilled over as a slightly yellowish, very viscous oil, boiling at 258–263° C. under 5 m. m. pressure.

In a similar way, using the same relative quantities of keto-acid, alcohol, and sulphuric acid, and boiling for 6 to 8 hours under reflux, the following esters were prepared.

| Acid used | Ester | Boiling point of ester | Properties |
|---|---|---|---|
| Ortho-benzoyl-benzoic | Iso-propyl | 240–243° C/20 m. m. | Heavy colorless liquid |
| Ortho-benzoyl-benzoic | Iso-amyl | 215–218° C/4 m. m. | Colorless, oily liquid |
| Ortho-benzoyl-benzoic | Benzyl | 278–282° C/16 m. m. | Colorless, oily liquid |
| Ortho-benzoyl-benzoic | Cyclohexyl | 251–254° C/10 m. m. | Colorless, oily liquid |
| Ortho-benzoyl-benzoic | Beta-butoxy-ethyl | 224–229° C/4 m. m. | Colorless, oily liquid |
| Ortho-benzoyl-benzoic | Capryl | 264–268° C/20 m. m. | Colorless, oily liquid |
| Para-toluyl-o-benzoic | Iso-propyl | 217–218° C/8 m. m. | Colorless, oily liquid |
| Para-toluyl-o-benzoic | n-butyl | 244–248° C/17 m. m. | Colorless, oily liquid |
| Para-toluyl-o-benzoic | Iso-amyl | 224–228° C/4 m. m. | Colorless, oily liquid |
| Para-toluyl-o-benzoic | Beta-ethoxy-ethyl | 237–238° C/5 m. m. | Colorless, oily liquid |
| Para-toluyl-o-benzoic | Benzyl | 305–310° C/4 m. m. | Colorless, oily liquid |
| 2-4-dichloro-benzoyl-benzoic | n-butyl | 232–237° C/7 m. m. | Colorless, oily liquid |
| Ortho-naphthoyl-benzoic | Benzyl | 315–318° C/5 m. m. | Heavy oil |
| Ortho-naphthoyl-benzoic | Cyclohexyl | above 320° C/4 m. m. | Very viscous oil |

All of the above esters may be used as plasticizers for nitrocellulose or for acetyl cellulose.

For plasticizing nitrocellulose any of the above esters are added to a solution of nitrocellulose in any appropriate solvent or mixture of solvents. Pigments, dyes, and resins may likewise be added.

A typical lacquer for example, is one containing:

Parts by weight
Nitrocellulose (1/2 sec viscosity) _____20
Butyl acetate_____50
Ethyl acetate_____10
n-butyl-p-toluyl-o-benzoate_____10
Ester gum_____ 5
Toluene_____40

The quantities of plasticizer used can be varied to give greater or less hardness to the final film.

Other esters of acids belonging to the general class

wherein R and R' are aromatic nuclei, may likewise be prepared for the same purpose. These include the propyl, iso-butyl, amyl, bornyl and methylcyclohexyl esters. All of these esters may be represented by the following formula:

wherein R and R' are aromatic nuclei, and X is an organic radicle containing at least three carbon atoms.

Although only the preferred embodiments of this invention have been described in detail it will be apparent to those skilled in the art that various other acids than those specifically mentioned, but belonging however, to the same general class, may be used. Thus I have successfully employed para-ethyl-benzoyl-o-benzoic acid, dimethyl-benzoyl-o-benzoic acid, para-phenyl-benzoyl-o-benzoic acid, alpha- and beta-methyl naphthoyl-o-benzoic acids, α-chlornaphthoyl-o-benzoic acid and tetrahydro-naphthoyl-o-benzoic acid for preparing similar esters.

What I claim is:

1. A composition of matter comprising nitrocellulose and the butyl ester of para-toluyl-ortho-benzoic acid.

2. A composition of matter comprising nitrocellulose and the cyclohexyl ester of para-toluyl-ortho-benzoic acid.

3. A composition of matter comprising nitrocellulose and the beta-ethoxy-ethyl ester of para-toluyl-ortho-benzoic acid.

4. A plasticized composition comprising a plastic substance of the group consisting of cellulose nitrate and cellulose acetate and an ester of a keto aromatic acid with a monohydric alcohol.

5. A plasticized composition comprising a plastic substance of the group consisting of cellulose nitrate and cellulose acetate and an ester of ortho-benzoyl benzoic acid with a monohydric alcohol.

6. A plasticized composition comprising an organic plastic substance and an ester of a keto aromatic acid with a monohydric alcohol.

7. A plasticized coating composition comprising a solution of an organic plastic substance and an ester of a keto aromatic acid with a monohydric alcohol.

8. A composition according to claim 6 in which the ester is an ester of an acid belonging to the homologous series of which the lowest member is orthobenzoylbenzoic acid.

9. A composition according to claim 6 in which the ester is a benzoyl-benzoate.

10. A plasticized composition comprising an organic plastic substance and an ester of a monohydric alcohol with a keto aromatic acid in which two aryl radicals are directly connected to the ketone group and the carboxylic acid group is ortho to the ketonic group.

11. A plasticized composition comprising an organic plastic substance and an ester of a monohydric alcohol having 2 to 10 carbon atoms with a keto aromatic acid in which two aryl radicals are directly connected to the ketone group and the carboxylic acid group is ortho to the ketonic group.

In testimony whereof I affix my signature.

HERMAN A. BRUSON.